United States Patent [19]

Brock

[11] Patent Number: 4,985,638
[45] Date of Patent: Jan. 15, 1991

[54] VALVE CONTROL CIRCUIT FOR IRRIGATION SYSTEM

[76] Inventor: James R. Brock, 1401 N. Rhodes St., No. 405, Arlington, Va. 22209

[21] Appl. No.: 176,185

[22] Filed: Mar. 31, 1988

[51] Int. Cl.⁵ .......................................... H01H 47/14
[52] U.S. Cl. ...................................... 307/38; 307/37; 307/41; 361/168.1; 361/166
[58] Field of Search ............................... 307/38–41, 307/141, 143, 154, 141.4; 340/310 A, 310 CP, 825.06; 137/624.2, 624.11, 624.12, 624.18, 78.3; 239/63–70; 361/166, 167, 168.1, 169.1, 170, 171

[56] References Cited

U.S. PATENT DOCUMENTS

| 2,852,701 | 9/1958 | Leonard | 361/166 X |
| 3,180,999 | 4/1965 | Kuykendall | 307/41 |
| 3,335,319 | 8/1967 | Warner | 307/37 X |
| 3,521,130 | 7/1970 | Davis et al. | 361/168.1 |
| 3,723,827 | 3/1973 | Griswold et al. | 307/38 X |
| 3,875,421 | 4/1975 | Anshus | 307/66 X |

FOREIGN PATENT DOCUMENTS 999026 1/1952 France ................. 363/126

OTHER PUBLICATIONS

Time–Code Receiver Clock-3, by A. F. Cross, B. Sc., Wireless World, Apr. 1976, pp. 56–58.
Power-Supply Voltage Changed 2:1 with SPDT Switch Arrangement by Electronic Design, Feb. 16, 1976, p. 174.
"Dry-Disc Rectifier As Control Circuits Components", by Ronald L. Ives, Jul. 1949, from Radio & Television News, pp. 82 and 84.

Primary Examiner—William M. Shoop, Jr.
Assistant Examiner—Paul Ip
Attorney, Agent, or Firm—Whitham & Marhoefer

[57] ABSTRACT

A circuit for the remote control of solenoid operated valves in an irrigation system reduces by one half the amount of wire required for the system. At least one pair of first and second solenoids are connected to a source of supply of alternating curent, typically through a low voltage circuit. A switching circuit selectively connects the source to the solenoids through a conductor having a diode network at either end of the conductor. One of the diode networks comprises a pair of diodes connected in anti-parallel relation across the switching circuit, and the other of said diode networks comprises a pair of oppositely poled diodes respectively connected between the conductor and a corresponding one of the solenoids. In operation, no current is supplied to the solenoids, current is supplied to the first solenoid on positive half cycles, current is supplied to the second solenoid on negative half cycles, or current is supplied simultaneously to both of said solenoids, depending on the operation of the switching circuit.

3 Claims, 1 Drawing Sheet

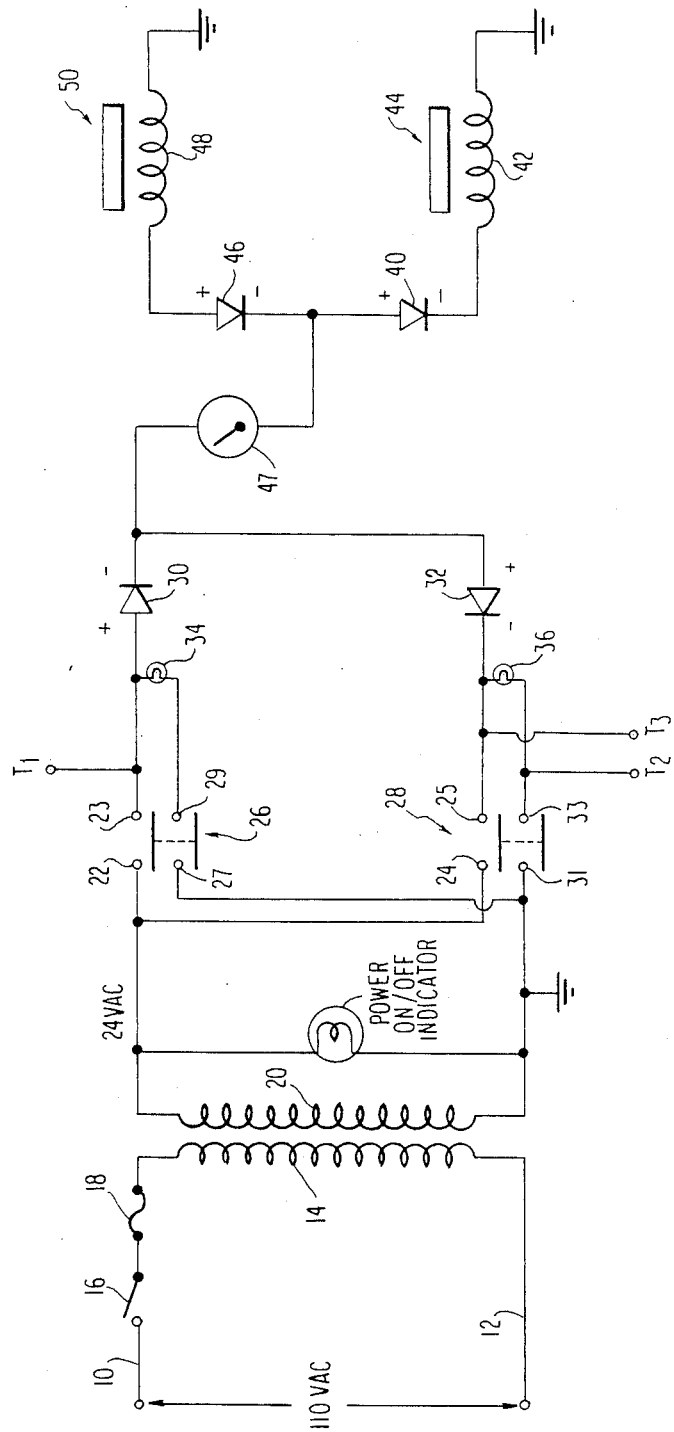

VALVE CONTROL CIRCUIT FOR IRRIGATION SYSTEM

DESCRIPTION BACKGROUND OF THE INVENTION

1. Field of the Invention

The present invention generally relates to remote control systems and, more particularly, to controls and circuits for solenoid operated remote control sprinkler valves used in irrigation systems.

2. Background of the Invention

Large areas of land which are grass covered and landscaped require attention and maintenance on a scheduled basis. Areas that are used regularly, for example for recreation, such as golf courses, require special care including watering on a time controlled schedule. Irrigation and watering is usually done by the use of a sprinkler system which necessarily includes a large number of sprinklers having the associated piping substantially permanently installed and being controlled from a remote location. A golf course or similar large area, may require an irrigation system having several hundred sprinklers, miles of piping and, in the case of sprinklers having remotely controlled electro-mechanically operated valves, such as solenoid operated valves, miles of electrical wiring as well.

An irrigation system of their general type is shown and described in U.S. Pat. No. 4,244,022 to Kendall. A sprinkler system specifically for use on parkways and other green strips which require periodic watering but infrequent maintenance of other sorts is shown and described in U.S. Pat. No. 3,911,955 to Link. Each sprinkler valve includes an on and an off solenoid for opening and closing the valve. This system is battery operated to eliminate the cost of laying power lines. It is timer controlled, includes a timing switch for each sprinkler and requires three wires to connect each sprinkler valve to its timer switch. U.S. Pat. No. 3,951,339 to DuFresne shows an irrigation system comprising a central sequencing control station for controlling remote valve stations. Two wires are connected to each remote station for electrically actuating the valves.

A grounding arrangement for a sprinkler system that is programmed by a microprocessor and clock is disclosed in U.S. Pat. No. 1,215,382 to Davis. This is also a system with solenoid type sprinkler valves, each of which may be operated by either a common control wire, or as shown in the patent, an individual wire; however, in this patent the grounding arrangement requires a common ground wire to be connected to each solenoid. Another patent directed to controlling watering systems is U.S. Pat. No. 4,333,490 to Enter, Sr. Ambient conditions such as humidity, light and the like can be factored into the timing cycle for control of watering.

U S. Pat. No. 4,423,484 to Hamilton relates to a battery operated programmable control system using bi-stable solenoids, each of which requires three connecting wires including the ground wire. The auxiliary switching circuit described in U.S. Pat. No. 4,661,719 to Burchfiel et al. is intended for use in irrigation systems having solenoid controlled valves and is especially adapted to provide an add-on or repair device for such systems. This patent is also notable for the discussion contained in the introductory paragraphs relating to sprinkler systems maintenance and repair costs. Other patents of interest that show circuits for controlling solenoid operation include U.S. Pat. No. 4,173,031 to Leichle and U.S. Pat. No. 4,161,320 to Herran. The former shows a device using a current program to control solenoids independently, while the latter selectively controls operations of solenoids by a switching circuit.

As noted above, quantities of electrical wire are needed for installations in which solenoid operated devices, such as valves, which are remotely controlled, are employed. The cost of laying power lines is referred to in U.S. Pat. No. 3,911,955 to Link as the basis for using battery power for control and operation in some areas. Further, in U.S. Pat. No. 4,661,719 to Burchfiel et al., reference is made to the high cost of pulling and replacing wire from which it follows that initial installations of wiring in accordance with current practice are very substantial. The systems disclosed in the patents discussed above as well as those in actual use are multi-wire systems or at best use one conductor and a common ground for each solenoid operating a sprinkler valve.

SUMMARY OF THE INVENTION

It is therefore and object of the present invention to provide a remote control system for solenoid operated valves which reduces the amount of wire required.

It is another object of the invention to provide an irrigation system with a central control that requires a reduced amount of wire to control sprinkler valves.

It is a further object of the invention to provide an irrigation system which is less expensive to install and maintain than existing systems.

The circuit of the present invention permits using one conductor to operate the solenoids for two remotely controlled valves, thus reducing the amount of wire needed for a new installation or, in the alternative, increasing the number of solenoid actuated devices for a given amount of wiring in an installation. It is obvious that in such an extensive installation as a golf course using solenoid operated sprinkler valves, the savings in wire cost and the expenses connected with installing it would be considerable to say the least. These savings are accomplished by the use of the circuit of the present invention. The circuit comprises diode networks at each end of a single conductor feeding a pair of solenoids so that one solenoid receives only positive half cycles of the alternating current supply, while the other solenoid receives only negative half-cycles. Thus, by switching, four possible conditions can be controlled; namely, no current, positive current only, negative current only, or both positive and negative current. The corresponding conditions of the solenoids are as follows: neither energized, one or the other solenoid selectively energized and the opposite one not energized, or both solenoids energized. Each of these conditions, of course, corresponds to the desired condition of the controlled device, for example, sprinkler valves.

BRIEF DESCRIPTION OF THE DRAWINGS

The foregoing and other objects, aspects and advantages of the invention will be better understood from the following detailed description of a preferred embodiment of the invention with reference to the accompanying drawing. The sole FIGURE is a schematic diagram of the circuit of the present invention.

DETAILED DESCRIPTION OF A PREFERRED EMBODIMENT OF THE INVENTION

Referring now to the drawing, the circuit embodying the present invention is shown as having an alternating current power supply, nominally 110 VAC, connected by lines 10 and 12 to the primary winding 14 of a transformer. Line 10, which is the high side of the supply, includes on/off switch 16 and fuse 18 in series with the transformer primary winding 14, while line 12 is shown grounded The transformer output is nominally 24 VAC available at the terminals of transformer secondary winding 20. The high side of the secondary winding 20 is connected to terminal 22 of switch 26 and to terminal 24 of switch 28. Switches 26 and 28 are each single throw, double pole switches and may be either toggle or push-button switches. Terminal 23 switch 26 is connected to the anode of junction diode 30 while terminal 25 of switch 28 is connected to the cathode of junction diode 32. The two diodes 30 and 32 have their other terminals, i.e., the cathode of diode 30 and the anode of diode 32, connected in common and are thus connected in anti-parallel relation with each other. The other pole of switch 26 includes terminal 27, connected to the grounded side of secondary winding 20, and terminal 29, connected through an indicator light 34 to the junction of terminal 23 and the anode of diode 30. The second pole of switch 28 includes a terminal 31, connected to the ground side of secondary winding 20, and a terminal 33, connected through an indicator light 36 to the junction of terminal 25 and the cathode of diode 32. Indicator lights 34 and 36 should be of different colors to identify which switch has been turned on and ultimately which of the two devices controlled by the circuit is actuated.

For test and maintenance purposes, meter 47 may be inserted in the circuit to provide an indication of the amount of current being used. Also shown are terminals $T_1$, $T_2$ and $T_3$ to accomodate test jacks.

The junction of the cathode of diode 30 and the anode of diode 32 is connected, through meter 47, to the anode of diode 40 which has its cathode connected through coil 42 of valve actuating solenoid 44 to ground. Diode 46, which is poled oppositely to diode 40, has its cathode connected in common with the anode of diode 40 and its anode connected through coil 48 of valve actuating solenoid 44 to ground. A suitable valve for sprinkler operation and use in this circuit is available commercially from the Toro Company, identified as their model No. 260-06-04.

While the mode of operation of the circuit for the most part is obvious from the foregoing description, it is pointed out that when switch 16 is closed and power is applied, but neither of switches 26 nor 28 is in the on position, no power is supplied to the coils 42 and 48 of the solenoids and valves 44 and 50 will both be closed; i.e., in non-operative condition, assuming the application is, for example, in a sprinkler system or the like. However, if switch 26 is turned on while switch 16 is closed, diodes 30 and 40 will conduct during the positive half-cycles of the supply voltage and current will flow through coil 42 to ground, actuating valve 44. Indicator light 34 will be lit showing that valve 44 is functioning. If switch 26 is now opened and switch 28 is closed, diodes 32 and 46 will conduct on negative half-cycles of the supply voltage allowing current to flow through coil 48 to operate valve 50. Corresponding indicator light 36, of different color than light 34, will be lit indicating operation of valve 50. Further, when both switches 26 and 28 are closed simultaneously, with the alternating current power being on to the circuit, current will flow through the coils 42 and 48 of the respective valve actuating solenoids 44 and 50, resulting in operation of both valves at the same time. Both indicator lights 34 and 36 will then be turned on to indicate this mode of operation. Thus, the invention provides an electro-mechanical control circuit requiring a single conductor to operate either one or the other of two solenoids at a time or both of them simultaneously, providing versitility and economy.

While the drawing shows ground symbols, those skilled in the art will understand that a separate ground wire would ordinarily be used to provide the best electrical continuity of the circuit and, therfore, the best operation.

There are other applications of the present invention besides initial construction of an irrigation system which result in savings. For example, the invention can be used where it is desired to add sprinklers to an existing installation by simply connecting another sprinkler and its associated control circuit, namely, the connections, diode and solenoid to the existing system as desired. Thus, the number of sprinklers used on the fairways of a golf course can be increased by simply adding to the existing installation, according to the present invention.

Another application involving golf courses is irrigation of greens. Presently, to insure full coverage without overlap, a concept known as part circle irrigation is employed This invention makes possible the inexpensive installation of pairs of sprinklers with control circuits, enabling them to be operated as above, i.e., both off, one or the other on and the remaining one off or both on, and is especially adapted to this requirement. For example, a likely configuration for a particular green would be pairs of sprinklers, say four sprinklers, capable of being controlled in the above manner, strategically placed in accordance with the part circle watering concept. Such a sprinkler configuration would include controls according to this invention and provide a very flexible system at substantially reduced cost.

It is to be noted that although the circuit of the invention is described as being applicable to sprinkler systems, it may be used to operate other and similar electro-mechanical devices. Also, it will be understood that although the invention has been described as comprising two controlled elements, any number of elements can be controlled by simply duplicating the circuit the requisite number of times. Likewise, while a simple manually operating switching arrangement has been described, the circuit can be operated automatically by any number of available timers, or if desired by a system including a clock and a microprocessor. Thus, while the invention has been described in terms of a single disclosed preferred embodiment, those skilled in the art will appreciate that the invention may be practiced with modification within the spirit and scope of the appended claims.

Having thus described my invention, what I claim as new and desire to secure by Letters Patent is as follows:

1. In an irrigation system comprised of at least a first solenoid actuated sprinkler positioned to water a first location, a water transporting conduit connecting a source of water to said first solenoid actuated sprinkler, and a single conductive pathway electrically connecting said first solenoid actuated sprinkler to a source of alternating current at a central location remote from said first location, the improvement comprising an add on package for adding a second solenoid actuated sprinkler to the irrigation system at a second location remote from the central location without having to trench electrical wiring from the central location out to said second location, said add on package comprising:

said second solenoid actuated sprinkler connected to said single conductive pathway, said second solenoid actuated sprinkler to be positioned at said second location remote from aid central location;

a first diode connected between said single conductive pathway and said first solenoid actuated sprinkler;

a second diode connected between said single conductive pathway and said second solenoid actuated sprinkler, said first and second diodes being oppositely poled;

a pair of switches connected to said single conductive pathway at said central location so as to selectively supply alternating current from said source of alternating current to said first and second solenoid actuated sprinklers through said single conductive pathway; and third and fourth diodes connected to said single conductive pathway in an antiparallel relationship across said pair of switches, whereby said add on package permits selective operation of said first and second sprinklers by actuation of said pair of switches where either (i) no current is supplied to either said first or said second solenoid actuated sprinklers, thereby preventing watering at either said first or said second remote locations, (ii) current is supplied only to said first solenoid actuated sprinkler on positive half cycles, thereby watering at only said first remote location, (iii) current is supplied only to said second solenoid actuated sprinkler on negative half cycles, thereby watering at only said second remote location, and (iv) current is supplied to said first solenoid actuated sprinkler on positive half cycles and current is supplied to said second solenoid actuated sprinkler on negative half cycles, thereby watering both said first and second remote locations.

2. A method for extending an irrigation system comprised of at least a first solenoid actuated sprinkler positioned to water a first location, a water transporting conduit connecting a source of water to said first solenoid actuated sprinkler, and a single conductive pathway electrically connecting said first solenoid actuated sprinkler to a source of alternating current, comprising the steps of:

positioning a second solenoid actuated sprinkler to water a second location;

connecting said second solenoid actuated sprinkler to said water transporting conduit;

electrically connecting said second solenoid actuated sprinkler to said single conductive pathway;

positioning a first diode between said single conductive pathway and said first solenoid actuated sprinkler and a second diode between said single conductive pathway and said second solenoid actuated sprinkler, said first and second diodes being oppositely poled;

connecting a pair of switches to said single conductive pathway at a central location remote from said first and second locations, said pair of switches being operative to selectively supply alternating current from said source of alternating current to said first and second solenoid actuated sprinklers through said single conductive path; and positioning third and fourth diodes in said single conductive path in antiparallel relationship across said pair of switches, whereby selective actuation of said pair of switches can achieve either (i) no current being supplied to either said first or said second solenoid actuated sprinklers, thereby preventing watering of either said first or said second location, (ii) current being supplied only to said first solenoid actuated sprinkler on positive half cycles, thereby watering only said first location, (iii) current being supplied only to said second solenoid actuated sprinkler on negative half cycles, thereby watering only said second location, and (iv) current being supplied to said first solenoid actuated sprinkler on positive half cycles and current being supplied to said second solenoid actuated sprinkler on negative half cycles, thereby watering both said first and second locations.

3. A method as recited in claim 2 further comprising the step of providing a pair of indicating devices for indicating when said first and second solenoid actuated sprinklers are watering the respective first and second locations, a first indicating device is actuated when a first of said pair of switches is operated and indicates that said first location is being watered, a second indicating device is actuated when a second of said pair of switches is operated and indicates that said second location is being watered.

* * * * *